(12) United States Patent
van Heeswyk et al.

(10) Patent No.: US 6,298,050 B1
(45) Date of Patent: Oct. 2, 2001

(54) SYSTEM AND METHOD FOR CANCELLING THE EXTRA INTERFERENCE CREATED DURING POSITION LOCATION IN A CDMA CELLULAR SYSTEM

(75) Inventors: Frank Martin van Heeswyk, Nepean; Paul Newson, Kanata, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/199,302

(22) Filed: Nov. 25, 1998

(51) Int. Cl.[7] ............................. H04B 7/216; H04B 1/10
(52) U.S. Cl. ......................... 370/335; 370/342; 375/144; 375/148; 375/349
(58) Field of Search ........................... 370/208, 209, 370/204, 252, 311, 313, 328, 335, 342, 441, 479, 349; 375/130, 140, 141, 144, 147, 148, 260, 267, 346; 455/456

(56) References Cited

U.S. PATENT DOCUMENTS

| | | | |
|---|---|---|---|
| 4,641,238 | 2/1987 | Kneib | 364/200 |
| 5,367,563 | 11/1994 | Sainton | 379/98 |
| 5,577,105 | 11/1996 | Baum et al. | 379/93 |
| 5,872,540 | * 2/1999 | Casabona et al. | 342/363 |
| 5,872,776 | * 2/1999 | Yang | 370/342 |
| 6,009,089 | * 12/1999 | Huang et al. | 370/342 |
| 6,067,333 | * 5/2000 | Kim et al. | 375/346 |
| 6,157,847 | * 12/2000 | Buehrer et al. | 455/561 |

OTHER PUBLICATIONS

Qualcomm CDMA Cell Site Modem (CSM) Data Sheet.

* cited by examiner

*Primary Examiner*—Ricky Ngo (57) ABSTRACT

Systems and methods for cancelling interference in received CDMA signals due to signals of users involved in position location in the received signals which have been digitized to form a composite digitized baseband signal which would otherwise interfere with the detection of other user's data streams. The particular user's signals are detected, and an estimate of the air interface for that user is made. The user's signals are then passed through a model of the air interface, and the resulting output is subtracted from the composite digitized baseband signal, thereby removing interference due to that user's signals.

20 Claims, 10 Drawing Sheets

SYSTEM AND METHOD FOR CANCELLING THE EXTRA INTERFERENCE CREATED DURING POSITION LOCATION IN A CDMA CELLULAR SYSTEM

FIELD OF THE INVENTION

The invention relates to systems and methods for cancelling interference and more particularly to a system and method for cancelling the extra interference created during position location in a CDMA cellular system.

BACKGROUND OF THE INVENTION

The link from a mobile station to a basestation in 3G (third generation) CDMA (code division multiple access) systems is a multiple access radio channel that uses CDMA as the access scheme. In this scheme many users share the same radio channel and each user is uniquely identified by a spreading code.

In 3G CDMA, the mobile transmitter in the mobile station is used by the end user to access the network. It may provide voice only, data only, simultaneous voice and data, and location services for many different environments including indoor, low mobility, full mobility, and fixed wireless. To support the various end user services, the mobile transmitter divides its channel into multiple subchannels. One of these subchannels is used to manage the air interface resource and aid in signal detection. This is the pilot subchannel. The remaining three subchannels are used to carry user data and to implement the air interface protocol.

The pilot subchannel carries pilot channel bits which have the characteristic that they are known at the receiver, and also carries PC (power control) bits which are easily detectable at the receiver, while the remaining channels carry information which is unknown at the receiver.

It is a well known fact that due to the nature of CDMA, the signals transmitted by one user will occupy the same bandwidth as signals transmitted by other users and in fact all the signals of other users may be modelled as a form of interference.

It is sometimes a requirement to determine the location of a user in a cellular network. Furthermore, the FCC has mandated that emergency calls (911 calls) made from cellular telephones shall be physically locatable to within 125 metres by the year 2001. This mandate was created so that emergency crews (fire, police, etc.) would be able to locate the caller in an emergency situation.

Locating a user in a cellular network is basically a triangulation process. The user's signal is received by several fixed base stations and the difference in the time of arrival of the signal at the base stations is used to estimate the user's position. For this system to work, the base stations must be in physically different locations; the physical location of the base stations must be known; and at least three base stations must be able to detect the user's signal. The first two criteria are usually satisfied by most cellular networks. The final criteria poses a problem in power controlled CDMA networks.

In a power controlled CDMA network (i.e., the 3G Cellular Network), a user's transmitted power is controlled by the base station with which it is communicating. The control algorithm is designed to minimize the amount of power transmitted by the mobile such that it still meets the minimum voice and data quality criteria. This is done in a CDMA network to minimize the amount of interference that each user adds to the other users also communicating with the base station. In the position location context, this has the unfortunate side effect of reducing the user's transmitted power to the point where only one base station can detect the signal, hence making position location impossible.

One way to solve the low power problem is for the mobile to increase its power when it needs to be located. This is a realistic solution since only emergency calls are located and there should only be a small percentage of emergency calls on a system at any one time. Unfortunately, increasing a mobile's power during an emergency call increases the amount of the interference that the other users see and thus degrades the quality of their signals.

Any substantial reduction in interference in a CDMA system is very important because this results in an effective increase in the system signal to noise ratio, and thereby allows a system to be deployed with fewer base stations. One of the most significant costs in deploying a CDMA network is simply that of obtaining rights to install base stations the desired locations. Any decrease in the number of base stations required, even at the expense of a slightly increased cost per basestation, would be desirable.

Many interference cancellation schemes have been proposed for eliminating the entire contribution of all other users. Such schemes are very complex because they require some sort of estimate of the received signals of the other users, and in many cases this estimate is very difficult to produce due to the user's weak signal strength.

SUMMARY OF THE INVENTION

This invention provides a technique for removing the extra interference created by the user being located during an emergency call when that user raises his transmitter power. By removing the interference the quality of the other users' signals on the network is not degraded.

Removing the extra interference created by the user being located during an emergency call (the interfering user) is a multiple step process. First, the interfering user is detected and decoded. This is a simple process since the interfering user's signal is stronger than all the other users signals. In detecting the interfering user, an estimate of the channel characteristics is made to determine the strength, number, and position of the multipath components of the user's signal. This channel information is used to reconstruct the interfering user's signal. Then, the reconstructed signal is subtracted from the composite received signal. This removes the interfering user's signal from the composite received signal, thus improving the signal-to-noise ratio of the other users on the system.

Preferably, the interference cancellation in this invention is only implemented when the interfering user's signal is much stronger than all the other user's individual signals.

It is an object of the invention to obviate or mitigate one or more of the above identified disadvantages.

According to a first broad aspect, the invention provides an interference cancellation circuit for cancelling interference due to a particular user signal forming part of a digitized baseband composite signal when the particular user signal satisfies a predetermined constraint, the circuit comprising: a baseband detection unit for detecting one or more detected data channels from said particular user signal and making an air interface channel characterization which is an estimate of an air interface channel over which the particular user signal was transmitted; user signal regeneration circuitry for generating an interfering user signal reconstruction which is an estimate of said particular user signal by modulating said one or more data channel streams taking into account said air interface channel characterization; delay circuitry for delaying the digitized baseband composite signal an amount substantially equal to the time it takes the baseband detection unit and user signal regeneration circuitry to create interfering user signal reconstruction; and subtraction circuitry for subtracting the interfering user signal reconstruction from the delayed digitized baseband composite signal to create a corrected digitized baseband composite signal.

According to a second broad aspect, the invention provides a CDMA receiver comprising: an antenna for receiving an RF composite spread spectrum signal over an air interface; RF down conversion and A/D conversion circuitry for converting the composite spread spectrum signal into a digitized composite baseband signal; an interference cancellation circuit for cancelling interference due to a particular user signal forming part of a digitized baseband composite signal when the particular user signal satisfies a predetermined constraint, the circuit comprising: a baseband detection unit for detecting one or more detected data channels from said particular user signal and making an air interface channel characterization which is an estimate of an air interface channel over which the user signal was transmitted; user signal regeneration circuitry for generating an interfering user signal reconstruction which is an estimate of said particular user signal by modulating said one or more data channel streams taking into account said air interface channel characterization; delay circuitry for delaying the digitized baseband composite signal an amount substantially equal to the time it takes the baseband detection unit and user signal regeneration circuitry to create interfering user signal reconstruction; subtraction circuitry for subtracting the interfering user signal reconstruction from the delayed digitized baseband composite signal to create a corrected digitized baseband composite signal; and a baseband detection unit for each user signal other than said particular user signal connected to receive the corrected composite digitized baseband signal and the channel characterization information for that user signal, for producing one or more received data streams for that user signal.

According to a third broad aspect, the invention provides a method of reducing interference due to a particular user signal forming part of a composite digitized baseband signal comprising: selecting one of a plurality of user signals within said composite digitized baseband signal to the said particular user signal on the basis of one or more constraints; detecting one or more data channels in the particular user signal and making an estimate of an air interface over which the particular user signal was received; passing the detected data channels through a model of the air interface which is based upon the estimate of the air interface to produce an interfering user signal reconstruction; delaying the composite digitized baseband signal to produce a delayed composite digitized baseband signal an amount of time substantially equal to how long it takes for the steps of detecting and passing; subtracting the interfering user signal reconstruction from the delayed composite digitized baseband signal to produce a corrected composite digitized baseband signal.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In order to understand the invention it is important to have an appreciation of CDMA cellular systems. A brief overview of a CDMA cellular system will be given with reference to FIG. 1.

CDMA Cellular System Overview

Figure 1:
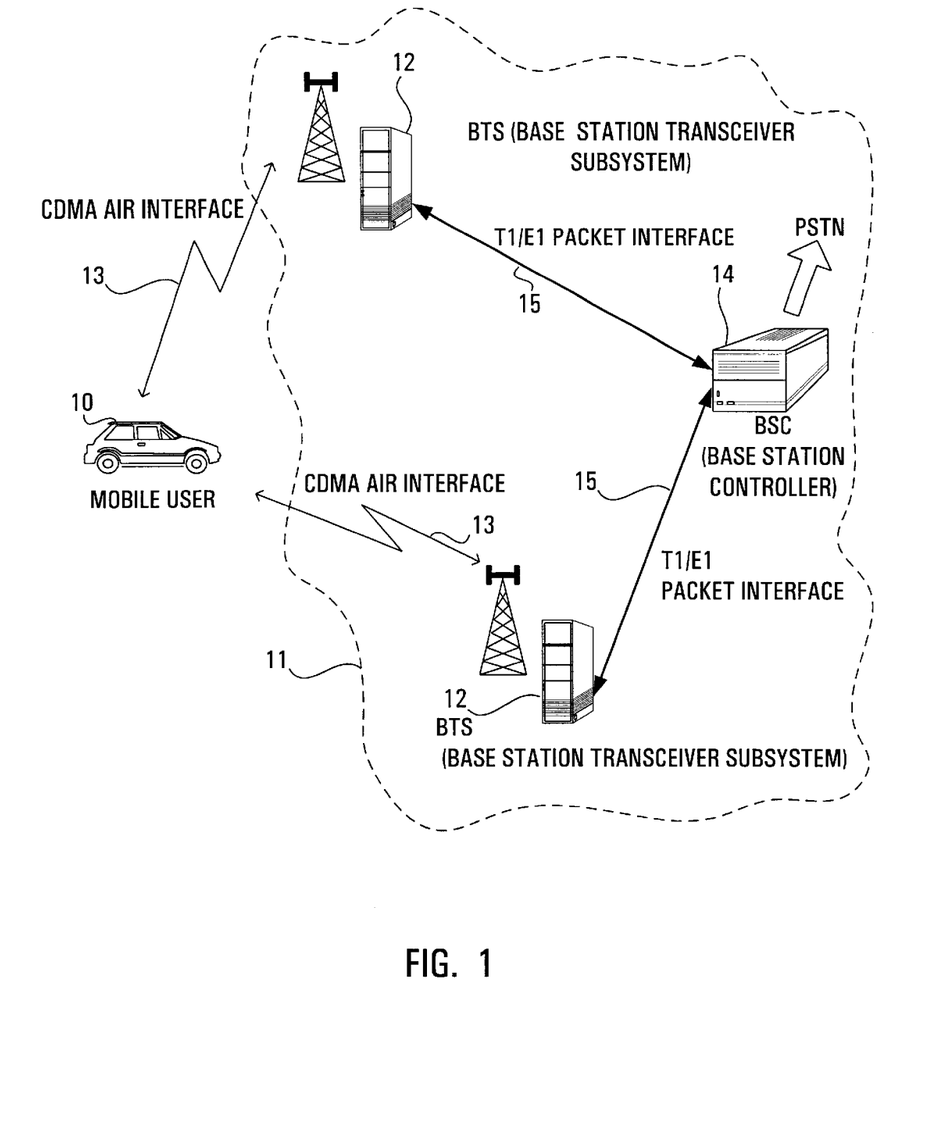
FIG. 1 is an overview of a conventional CDMA cellular system.

Referring firstly to FIG. 1, a generic CDMA cellular system comprises a plurality of terminals 10 (only one shown, shown inside a car), connectable through a CDMA air interface 13 to a network 11 comprising a plurality of BTSs 12 (only two shown), a plurality of BSCs 14 (only one shown) each connected to one or more BTSs, with each BSC connected to a MSC (mobile switching centre, not shown) forming part of or connected to a PSTN (public switched telephone network, not shown).

The terminal 10 consists of equipment used by an end user to make access to the network 11. It may provide voice only, data only, simultaneous voice and data, and location services for many different environments including indoor, low mobility, full mobility and fixed wireless. Within these different applications the terminal 10 may be referred to as a mobile station (MS), handset or simply mobile.

The BTSs 12 convert the network baseband data to signals compatible with the CDMA air interface 13. The link between the terminal 10 and the BTS 12 is over the air on the desired frequency band (e.g., cellular, PCS). The links between the BTSs 12 and the rest of the network 11 (through the BSC 14) are T1/E1 packet interfaces 15 that are typically carried over wire lines. The BTS 12 performs basic functions such as baseband signal processing (modulation, demodulation, encoding, decoding), channelization, conversion to and from RF (radio frequency), signal power amplification and transmission over the air interface.

The BSC 14 performs two principle functions. Firstly it performs the signal processing functions not encompassed within the BTS such as vocoder and soft hand off signal combining. Secondly it acts as the controller for numerous BTSs 12. It performs such functions as call setup/tear down, BTS 12 static and dynamic configuration and operations, administration and maintenance.

The MSC provides an interface to the PSTN and, therefore, allows mobile users to make access to the wider telephone network.

The link from the MSC to the terminal 10 is the "forward link" and the link from the terminal 10 to the MSC is the "reverse link".

In the forward link direction, data packets are sent by the BSC 14 addressed to a particular BTS 12 (or BTSs for soft hand off). The BTS 12 converts the packets into a form that adheres to a particular CDMA air interface standard. The BTS 12 then transmits the data to the terminal 10 over the CDMA air interface 13. In addition to performing this signal processing and routing function, the BTS 12 efficiently manages its resources and monitors performance. It also performs many of the management and control functions required to support the CDMA air interface standard. For example, it creates pilot, sync, and overhead channels.

In the reverse link direction the terminal 10 transmits its data to the BTS 12 over the CDMA air interface 13. The BTS 12 receives this data and converts it to a packet format that can be sent to the BSC 14 over the T1/E1 packet interface 15.

Figure 2:
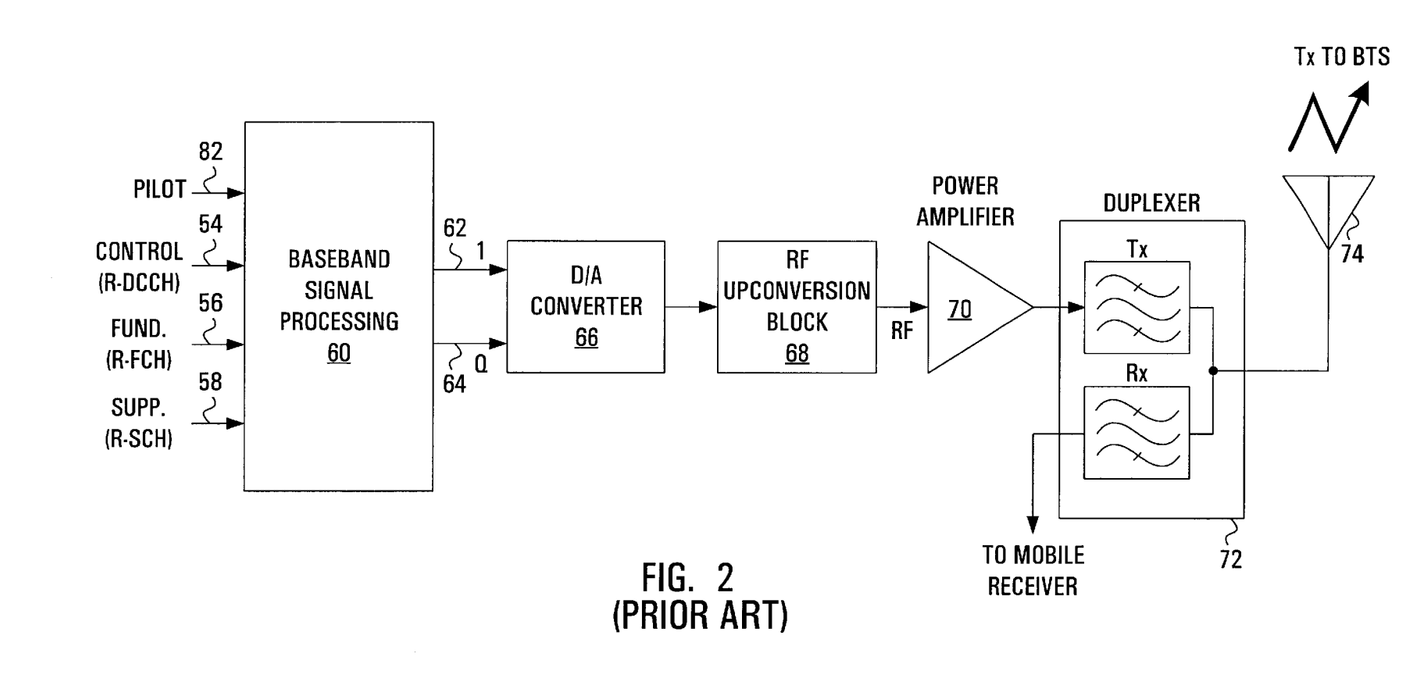
FIG. 2 is a block diagram of a conventional mobile station transmitter.

A conventional CDMA 3G mobile transmitter will now be described with reference to FIG. 2. To support various end user services, the mobile transmitter divides its transmitted data content into four channels. One of these channels is used to manage the air interface resource and aid in signal detection, namely the pilot channel 82. The pilot channel consists of pilot bits and PC bits multiplexed together in a 3 to 1 ratio. In each 1.25 ms time interval of pilot channel, the first three quarters of the time interval contains three known pilot bits while the fourth quarter of the time interval contains a single unknown PC bit. The PC bits are used to instruct the basestation to either increase or decrease the forward link power.

The three remaining channels consist of the control channel (R-DCCH) 54, the fundamental channel (R-FCH) 56, and the supplemental channel (R-SCH) 58, all of which are used to convey information. All of these channels are combined and processed at baseband in a baseband signal processing block 60 which functions as described in further detail below with reference to FIG. 3. The baseband signal processing block 60 produces in-phase (I) and quadrature (Q) digital baseband signals 62,64 which are converted to analog form by a digital-to-analog converter 66 and upconverted to the desired frequency band (PCS or Cellular for example) in a radio frequency upconversion block 68. Block 68 has an RF output which is fed through a power amplifier 70 to a duplexer filter 72 and on to the antenna 74 which transmits signals over the air interface for reception by a basestation. The duplexer filter 72 separates the mobile's transmit and receive bands. While a single physical RF spread spectrum signal is transmitted for each user, the RF spread spectrum signal may be considered as containing four components, one for each channel. At the receiver, the channels for three of these components will be completely unknown, while the channel for the fourth component will contain known data (the pilot bits) and unknown data (the PC bits).

Figure 3:
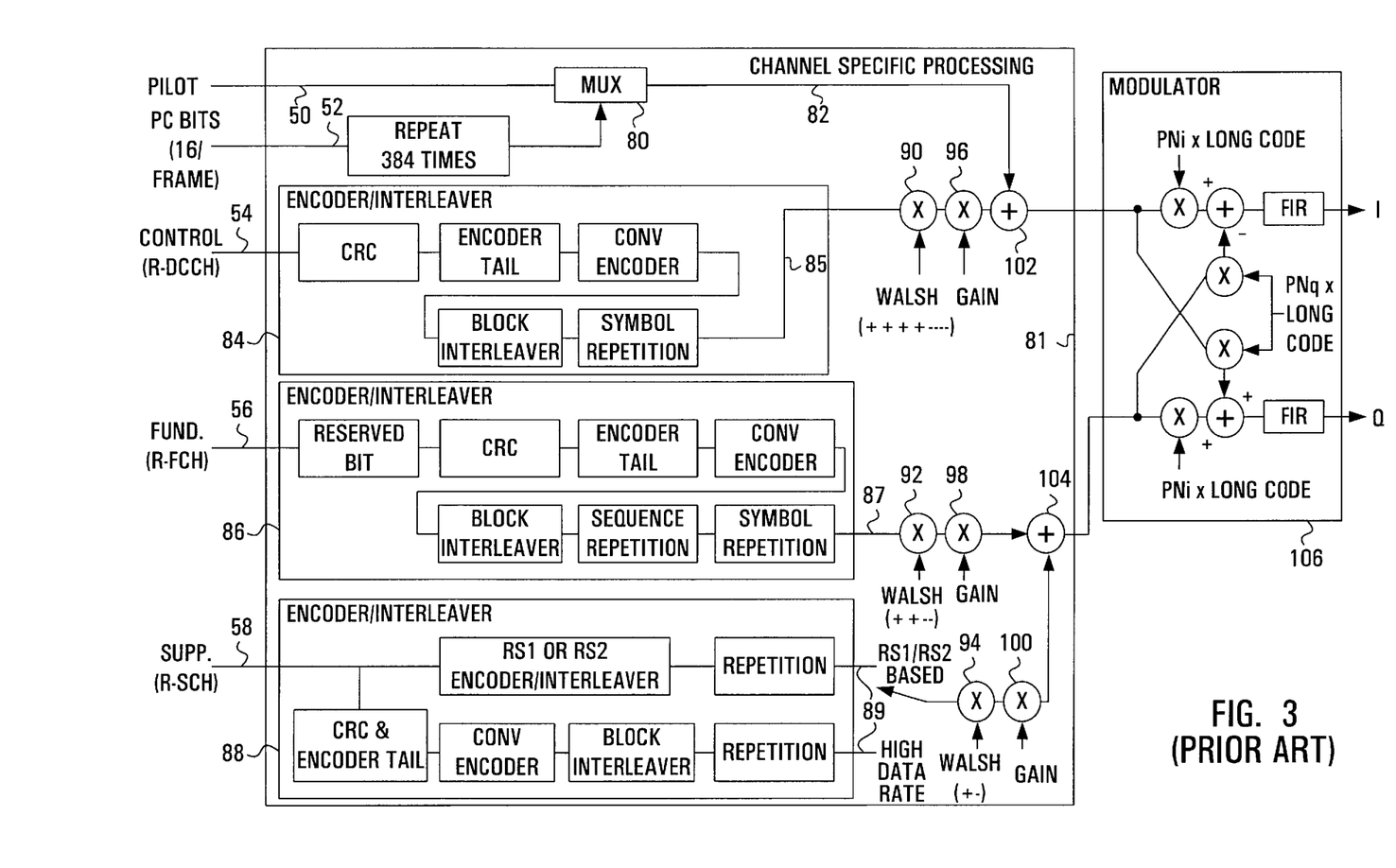
FIG. 3 is a detailed block diagram of the baseband signal processing block of FIG. 2.

The details of the baseband signal processing block 60 are illustrated in FIG. 3. There is a channel specific processing block 81 which contains channel specific functionality including multiplexing, encoding, interleaving, channel specific Walsh coding, and gain adjustment as described in detail below, and a short and long code modulator block 106 which performs code spreading and pulse shaping. A multiplexer 80 multiplexes the pilot and power control bits 50, 52 together to form a single channel 82 as described previously. The remaining three channels 54, 56, 58 are encoded and interleaved by respective encoder/interleaver blocks 84, 86, 88 each containing encoding and interleaving functionality particular to the channel type. Each of the encoder/interleaver blocks 84, 86, 88 have outputs 85, 87, 89 connected to respective Walsh code modulators 90, 92, 94 and subsequently to gain blocks 96, 98, 100. The Walsh code modulators modulate the outputs 85, 87, 89 by respective short Walsh codes which uniquely identify each of the various channels. For CDMA 3G, the Walsh code (++++−−−−) is used for the control channel output 85, the Walsh code (++−−) is used for the fundamental channel output 87, and the Walsh code (+−) is used for the supplemental channel output 89. The combined pilot/PC channel is uniquely identified by the all ones short Walsh code which has been left off the figure since it has no effect upon the signal. The unique short Walsh codes enables the basestation receiver to separate the channels.

The Walsh modulated channels are then combined with adders 102, 104 and processed by the short and long code modulator 106. This modulator 106 further modulates the combined channels by the user's unique long code and the particular cell's short code (PNi, PNq). This modulation enables the separation of the various users at the basestation receiver.

All of the user's transmitters are constructed in this manner. Multiple users in one cell are uniquely identified by their different long codes. The basestation receiver uses these different long codes to individually detect the ensemble of users received at the basestation.

Figure 4:
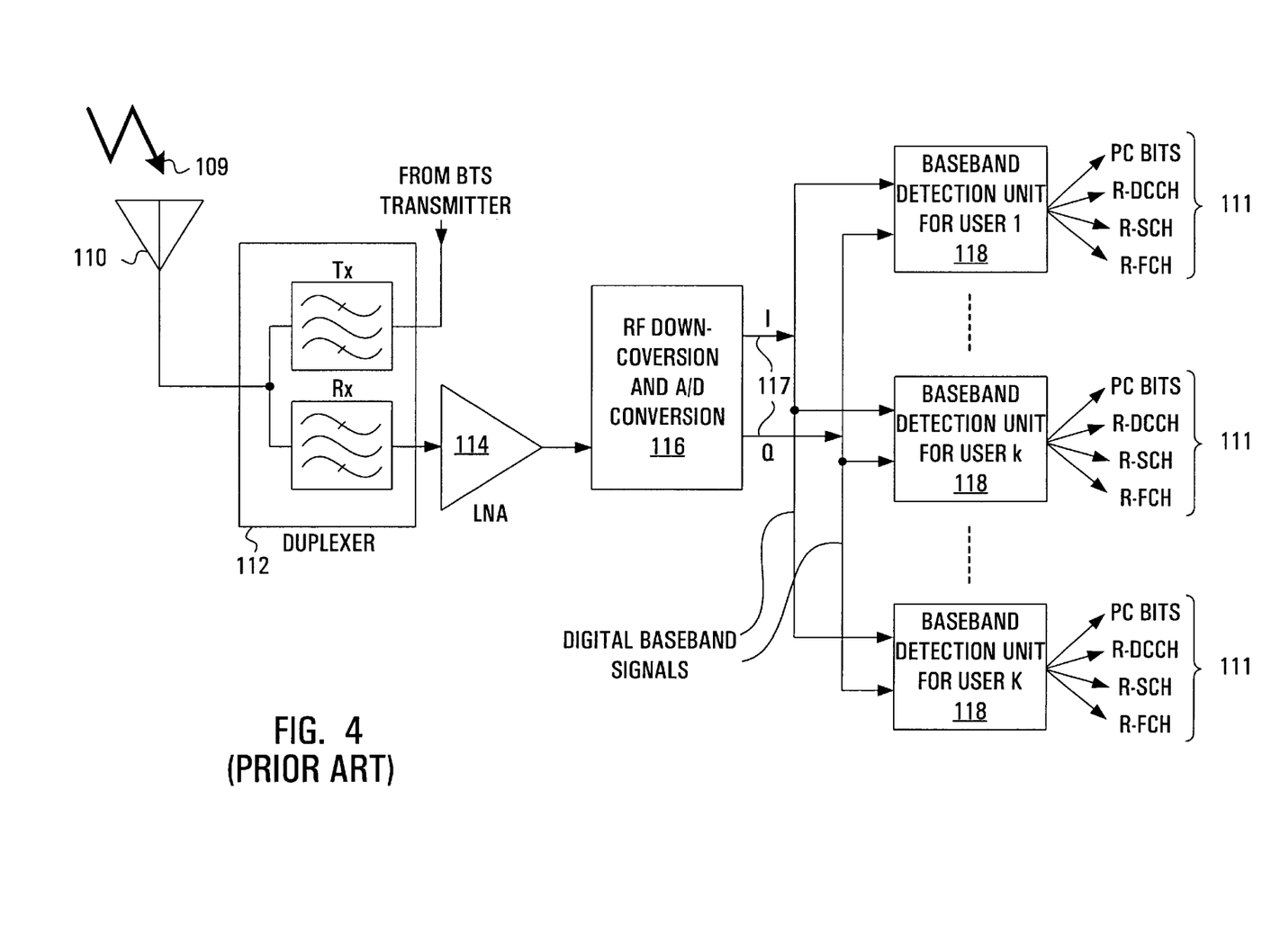
FIG. 4 is a block diagram of a conventional basestation receiver.

Referring now to FIG. 4, a conventional basestation receiver has the task of demodulating and decoding the signals from an ensemble of users. Its input 109 is the sum of all of the mobile's RF spread spectrum signals transmitted over the air. Its outputs are the individual user channel data streams 111 as sent by the mobiles.

There are five major parts to the basestation receiver as illustrated in FIG. 4. The antenna 110 receives the mobile's RF spread spectrum signals 109 from the air. The duplexer 112 separates the basestation receive signals from the basestation transmit signals that are delivered to the antenna 110. The low noise amplifier (LNA) 114 provides an initial low noise amplification of the received signals. The RF downconverter and A/D block 116 converts the air interface frequency band to a digitized base band composite signal 117 having I and Q components. At this point all the mobile user signals are present in the composite signal 117 and more particularly, the composite signal 117 will include a signal for each user, and each user signal will contain four digitized baseband components for the user, one for each channel. Each user signal contained in the composite signal 117 is in made up of one or more multipath signals, depending upon the air interface channel for the particular user. Finally several baseband detection units 118, one for each active user, separate the individual user's signal from the digitized baseband composite signal 117 and produces the individual user's channel data streams 111.

Figure 5:
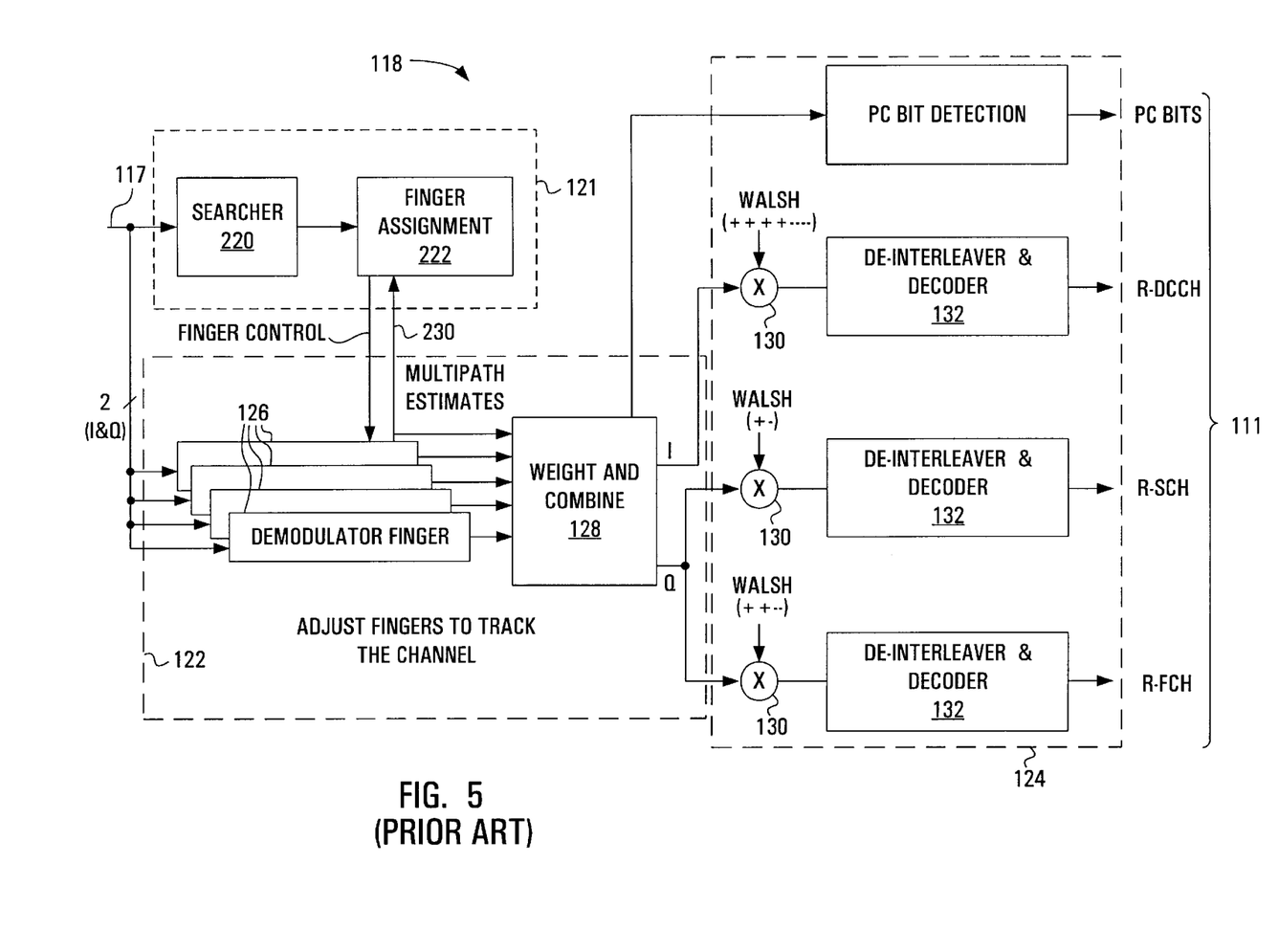
FIG. 5 is a detailed block diagram of a single baseband detection unit of FIG. 4.
Figure 6:
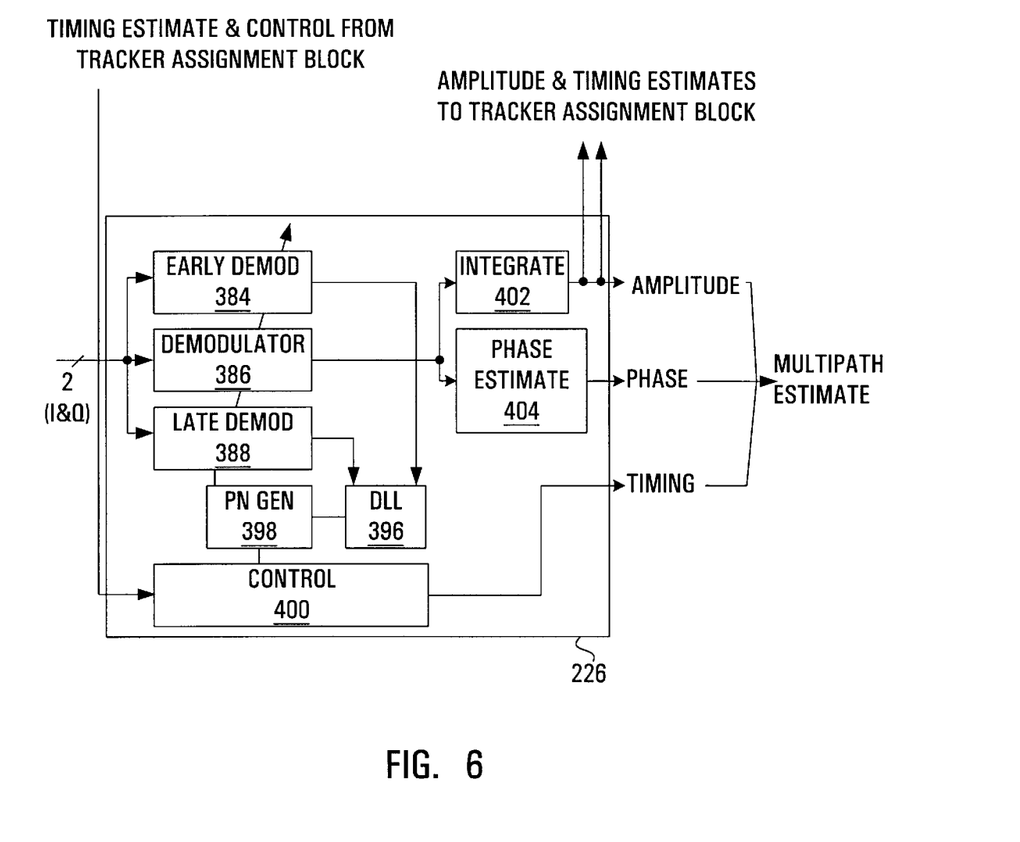
FIG. 6 is a block diagram of a tracker finger of FIG. 5.

The conventional baseband detection unit 118 is illustrated in detail in FIGS. 5 and 6. There are three major blocks within the baseband detection unit 118. A channel detection and estimation block 121 which detects the user's channel, estimates the air interface channel and assigns fingers to multipaths; a multipath tracker block 122 which detects and combines the multipath signals; and a channel specific processing block 124 which separates and decodes the user's channel data streams.

The estimates of the user's air interface channel determine the number and strength of the multipath signals. The a priori known pilot channel is used to facilitate this process. The air interface channel estimate is used to adjust a plurality of fingers 126 which detect the user signal on each of the multipaths. In the illustrated example, there are four fingers 126 which can track up to four multipaths. An implementation may use more or fewer fingers depending upon the performance requirements. The fingers 126 have outputs which are combined in a weight and combine block 128 to produce a single combined signal which is stronger than any of the individual multipath components. The combined signal is then separated into the user channels by multiplying by the channel short Walsh codes 130. The final step is to deinterleave and decode 132 the individual subchannels to yield the transmitted channel data streams 111.

The channel detection and estimation block 121 includes a searcher block 220 and a finger assignment block 222. The searcher block 220 identifies multipaths of the user's signal in a conventional manner. The finger assignment block 222 decides which multipaths to track, and assigns demodulator fingers 126 to these multipaths. This is done in conjunction with multipath channel estimates 230 fed back from the demodulated fingers 126. The multipath tracker block 122 produces detailed multipath estimates. The multipath tracker block 122 contains a number of demodulator fingers 126, each demodulator finger enabling the tracking of a single multipath of the particular user's signal. Typically four fingers are used, but more or less may be used depending upon the performance requirements. Each demodulator finger 126 characterizes a multipath according to three quantities, namely its amplitude, phase, and timing. These three quantities provide sufficient information to characterize the air interface channel for that particular user.

By way of example, a single tracker finger 126 is shown in FIG. 6. Each tracker finger 126 comprises three demodulators 384, 386, 388, a delay locked loop algorithm (DLL) 396 and a delay locked loop control block 400. The three demodulators 384, 386, 388 are configured to process delayed versions of the same input signal (the demodulators are referred to as early, on-time and late). Typically a delay of ½ a chip between demodulators 384, 386, 388 is used. At the input to each demodulator the signals are interpolated to 8fc and delayed by an amount appropriate to that demodulator. The early and late demodulator outputs are then processed within the delay locked loop algorithm 396. A delay locked loop output is used by the control block 400 and a PN generation block 398 for delay adjustment of the demodulators and to perform arrival tracking of the multipath so as to generate a timing estimate. The timing estimate determines where the start of a frame is with respect to a system clock, for example.

The on-time demodulator 386 has an output which is fed to an integrate function 402 which produces an estimate of the amplitude (or attenuation) of the particular multipath. The same output is fed to a phase estimate function 404 which produces an estimate of the phase of the particular multipath. The phase estimate is an estimate of the chip phase with respect to a system clock for example. Finally, the on-time output is fed to the weight and combine block 128.

The baseband detection unit 118 in the conventional basestation receiver only looks at a single user and considers all other users in the composite signal 117 to be noise. This receiver architecture ignores the fact that during position location a user's signal is much higher in amplitude and becomes a major interferer. This invention provides a system and method for the removal of the signals of users involved in position location before detecting the remaining user signals.

The invention provides for the removal of the signals from users involved in position detection according to a multiple step process. By way of overview, first, the pilot of the user involved in position detection is simultaneously detected and decoded. This is a simple process since the pilot data stream is known a priori. In detecting the pilot, an estimate of the air interface channel characteristics is made to determine the strength, number and position of the multipath components of the user's signal. The data on the remaining subchannels for the user involved in position detection is also estimated. The estimated data is used along with the channel information to reconstruct a received signal for the user which contains all of the user's subchannels. Then, the reconstructed signal for the user involved in position location is subtracted from the composite received signal to create a corrected composite received signal. This removes the interfering signal from the composite received signal thus improving the signal-to-noise ratio of the other users' information bearing channels.

Figure 7:
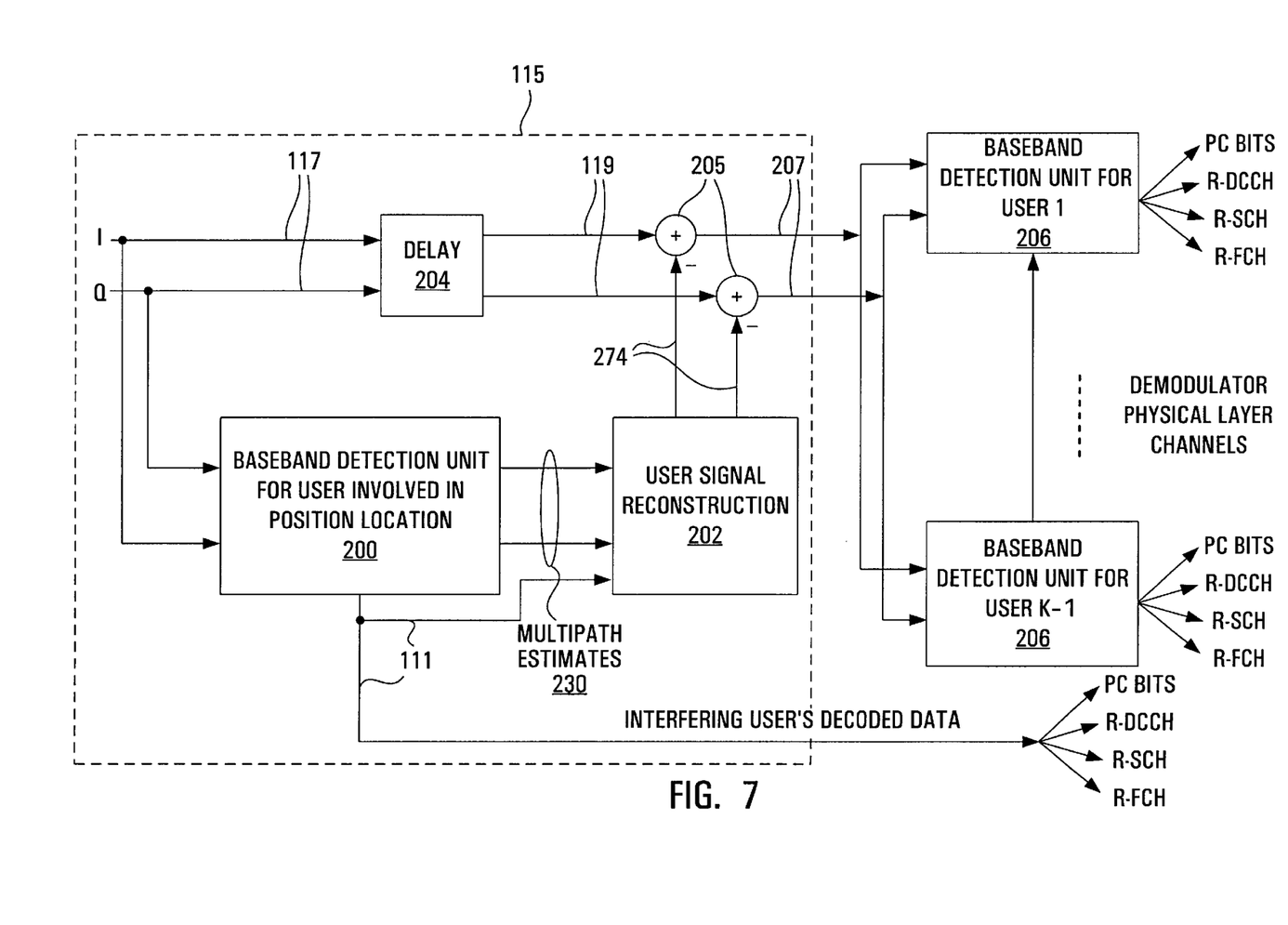
FIG. 7 is a block diagram of a basestation receiver architecture according to an embodiment of the invention.

Referring now to FIG. 7, a receiver architecture provided by an embodiment of the invention comprises a first baseband detection unit 200 which during certain times is reserved for a user involved in position location. The first baseband detection unit 200 receives as its input the baseband composite signal 117 and detects all of the channels of the user involved in position location. The receiver also includes a user signal reconstruction block 202 which outputs an interfering user signal reconstruction 274 for the user involved in position location, a delay block 204 which produces a delayed digitized baseband composite signal 119, subtraction circuitry 205 which produces a corrected digitized baseband composite signals 207 which is a version of the delayed digitized baseband composite signal 119 with the interfering user signal reconstruction 274 subtracted. This corrected signal 207 is passed to a plurality of baseband detection units 206, one for each user not involved in position location. If K users are to be supported by the receiver, then there needs to be a total of K baseband detection units. This will include the first baseband detection unit 200, and K-1 baseband detection units 206.

On average, very few users will be involved in position location at any time. As such, a design decision must be made as to how many such users will be compensated for in the receiver. For example, the receiver may be designed to compensate for two such users in which case the functionality of blocks 200,202 would be duplicated twice. Alternatively, resources may be shared across users, for example as disclosed in applicant's copending U.S. application Ser. No. 09/132,466 filed Aug. 11, 1998 which is hereby incorporated by reference.

The first baseband detection unit 200 is identical to the baseband detection unit described with reference to FIGS. 5 and 6 except for the fact that it has its data channel outputs 111 and multipath estimates 230 also passed to the user signal reconstruction block 202.

Figure 8:
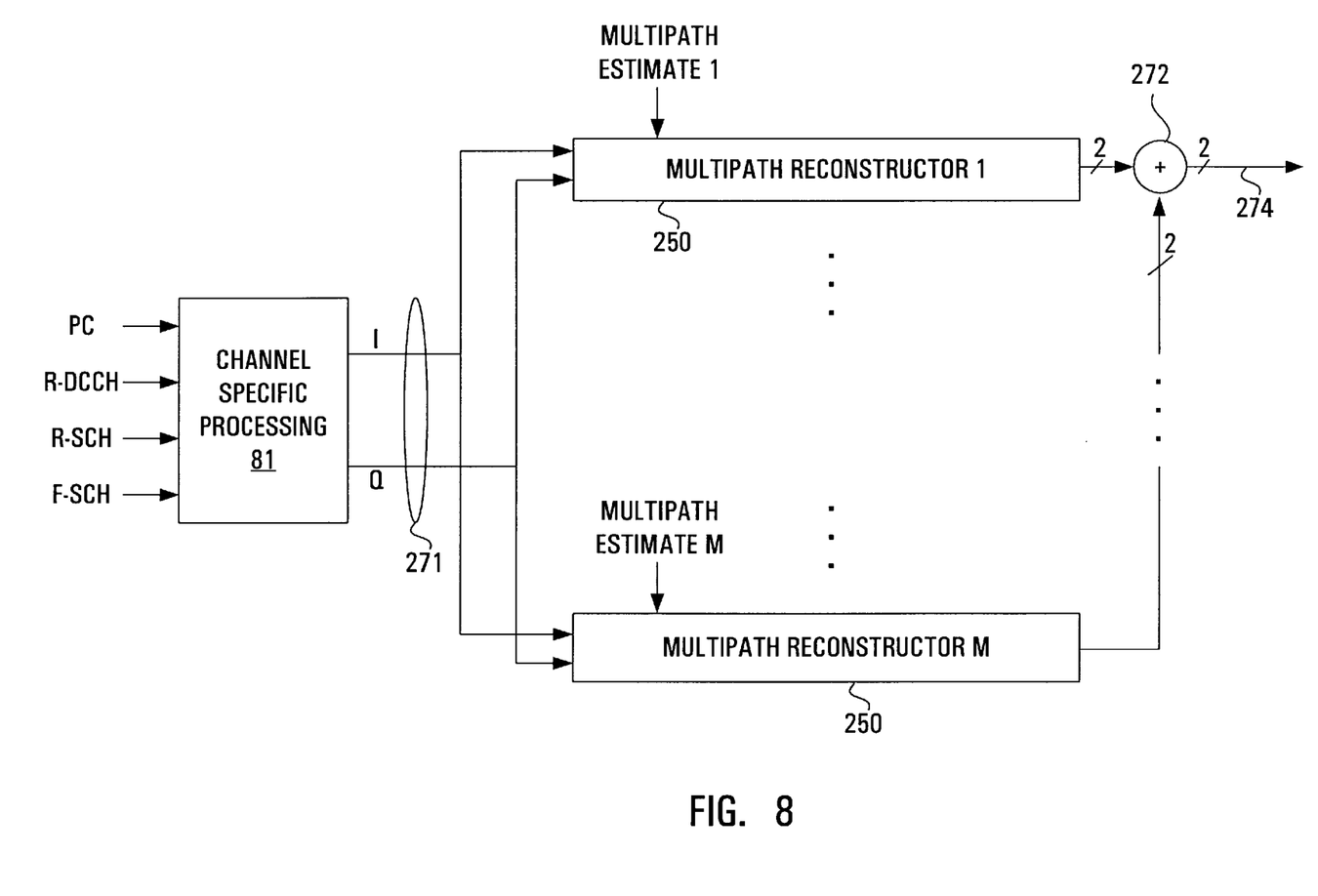
FIG. 8 is a block diagram of the user signal reconstruction block of FIG. 7.
Figure 9:
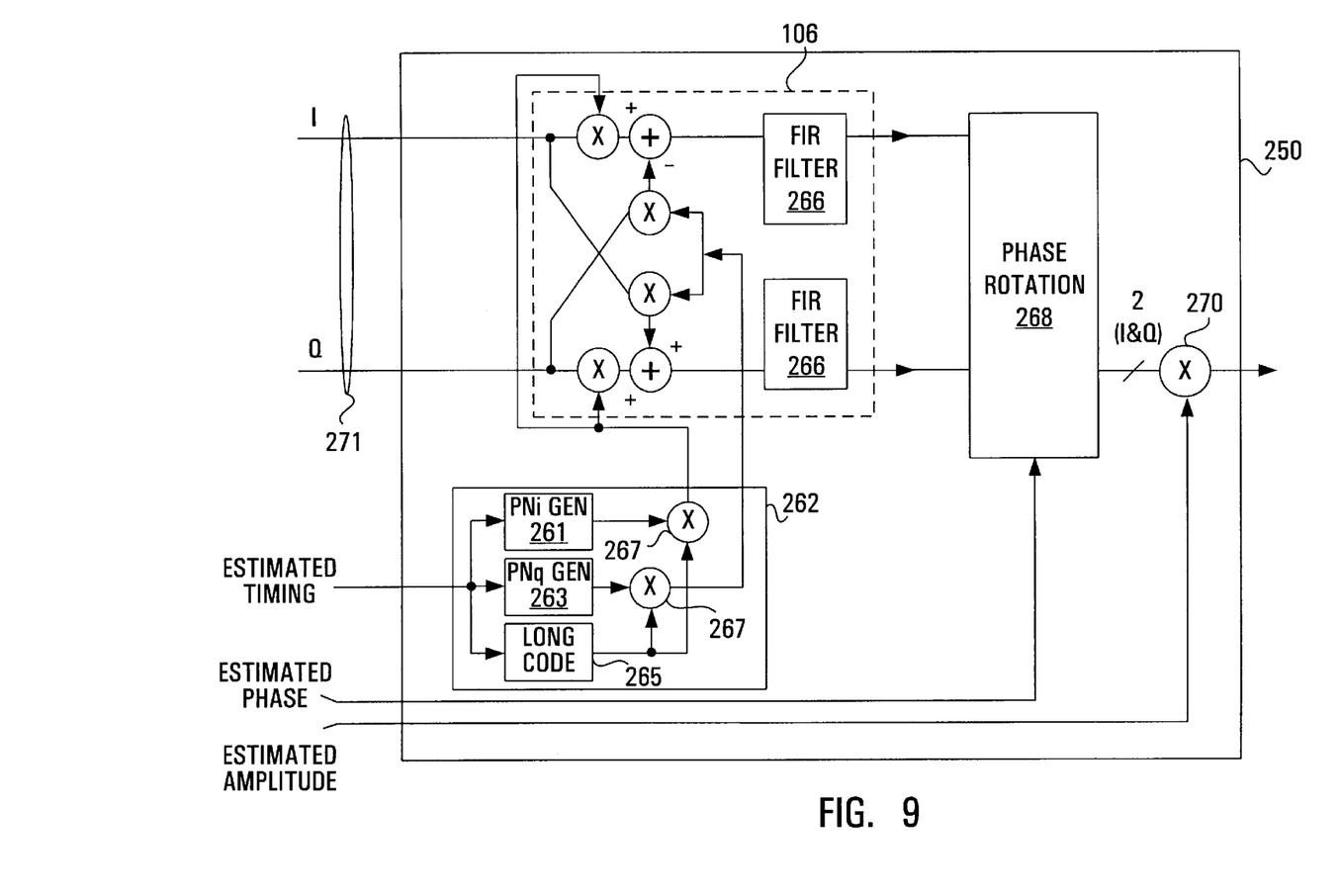
FIG. 9 is a block diagram of a single multipath reconstructor of FIG. 8.

The details of the user signal reconstruction block 202 will be described with reference to FIG. 8. There is a channel specific processing block 81 which is basically identical to that of a conventional transmitter as described previously respect to FIG. 3. In addition, there is a separate multipath reconstructor 250 for each tracker finger forming part of the first baseband detection unit 200 for the interfering user. The four data channels for the interfering user as detected by block 200 are input to the channel specific processing block 81 and combined into I and Q components 271. The input to each multipath reconstructor 250 is the multipath estimate (timing, phase, amplitude) for that particular multipath and the I and Q components 271 output by the channel specific processing block 81. A single reconstructor 250 is shown in FIG. 9. It contains a PN code generator 262, which has a PNi sequence generator 261, a PNq sequence generator 263 and a long code sequence generator 265 which are combined in multipliers 267. These combined sequences are then used to modulate the multiplexed signal 271 in a modulator 106 which is identical to the transmit modulator 106 of FIG. 3. The timing estimate is used to identify starting states for the PNi, PNq, and long code generators 261, 263, 265. Each of the PNi, PNq and long code sequences are generated by binary shift registers which have predetermined contents for each instant in time with respect to the start of a Frame. The timing estimate is used to identify this starting state information. There are known method for identifying PN states from timing offsets which may be used here. FIR (finite impulse response) filters 266 generate the actual pulse shapes for the pilot signal. A phase rotation block 268 is used to add in the estimated phase of the particular multipath. This is achieved by multiplying the FIR filter I and Q outputs by $e^{j\Phi}$, where $\phi$ is the phase estimate produced by the phase estimation function 404 (See FIG. 6). An amplitude weighting function (or attenuator) 270 is used to effect the estimated amplitude for the particular multipath. This is achieved by multiplying both I and Q outputs by the amplitude estimated by the integrate block 402 (see FIG. 6). The output of the amplitude weighting function 270 is an estimate of the particular digitized baseband multipath component of the user involved in position location as it would have been received.

Collectively, the multipath reconstructors 250 may be considered a model of the respective air interface. The multipath estimates are added together with one or more adders 272 to generate the interfering user signal reconstruction 274. This interfering user signal reconstruction 274 is subtracted from the delayed digitized baseband composite signal 119 (see FIG. 7) to create a corrected digitized baseband composite signal 207 substantially devoid of contents due to the user involved in position location.

To compensate for the delay introduced in blocks 200, 202, the delay block 204 introduces a comparable delay into the digitized baseband composite signal 117 to synchronize the signal path signals with the reconstruction 274 before subtraction. The corrected digitized baseband composite signal 207 is passed to the baseband detection units 206.

The above description of the interference cancellation circuit has been relatively independent of the manner by which the circuit is configured and controlled. There are many ways that the circuit can be controlled, and two such examples will be described with reference to FIG. 10.

Figure 10:
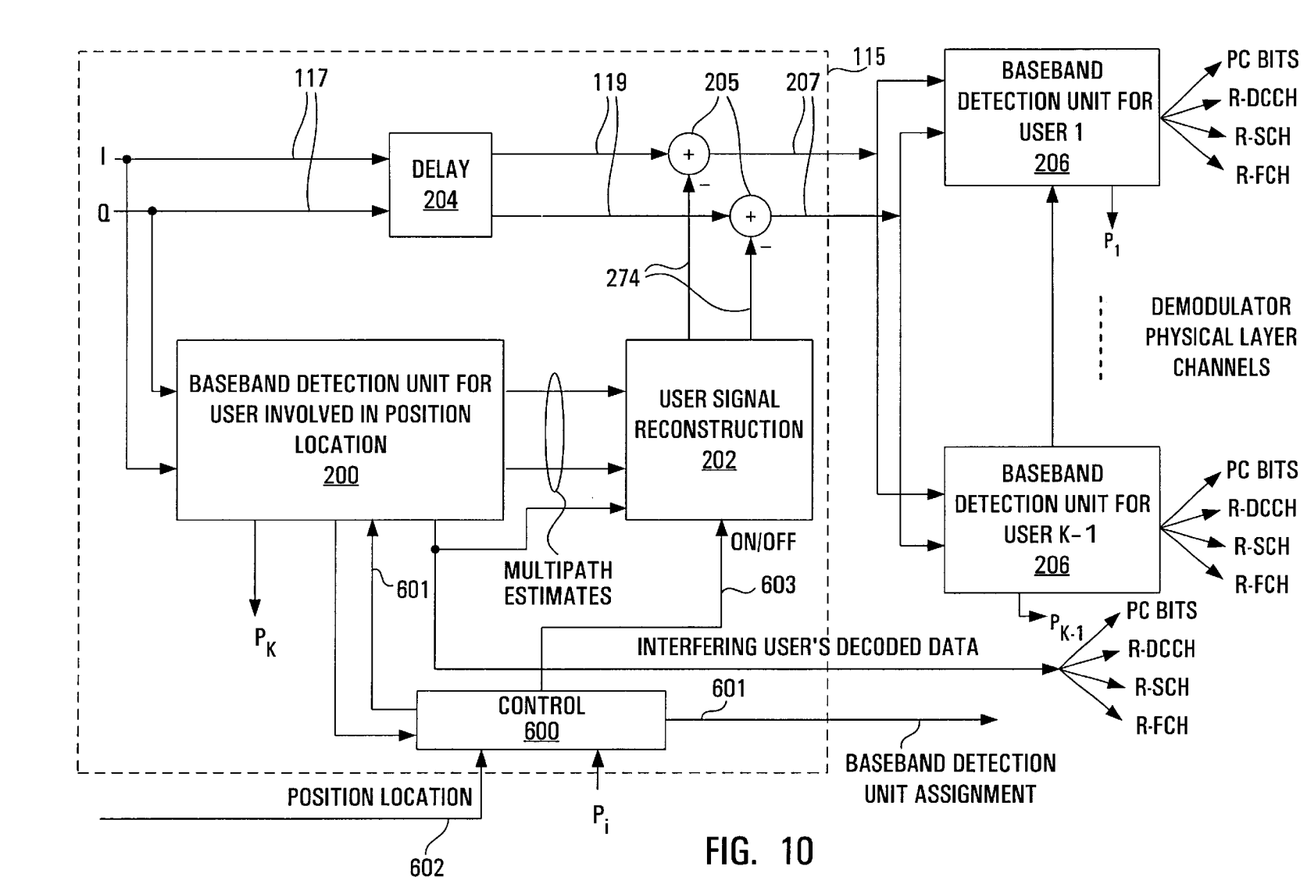
FIG. 10 is a block diagram of an interference cancellation circuit including control circuitry.

Referring now to FIG. 10, a control block 600 is provided which has a "position location input" 602 (from elsewhere in the basestation) indicating which users are involved in position location if any. The control block 600 configures the receiver in one of the two manners during normal operation. When there is no position location being attempted in the system, the user signal reconstruction block 202 is not active. Normal detection proceeds in the baseband detection units 200, 206. Any user can be assigned to any of the baseband detection units 200, 206 under this circumstance. It is a common design feature in CDMA receivers to allow baseband detection units to be dynamically assigned to any user so the details of this user assignment will not be dwelled upon here. For the purpose of example, it may assumed that the control block 600 is responsible through control lines 601 for controlling the assignment of the baseband detection units 200, 206. During a position location attempt, the user involved in position location is switched over to the baseband detection unit 200 forming part of the interference cancellation circuit if not already there, and the signal reconstruction block 202 is activated through control line 603 as soon as the interfering user's signal power satisfies some constraint. For example, it may be activated as soon as the interfering user's signal power exceeds that of one of the other users by some predetermined amount. The signal power $P_i$ of each of the users is a conventional output of the baseband detection units 200, 206, and this is used as an input to the control block. In the illustrated example, user K is the user involved in position location. At this time the interfering user can be reliably detected, and hence, reliably reconstructed and subtracted from the composite received signal. Once the position location is complete and/or the located user's power stops satisfying the constraint (or alternatively satisfies some other constraint), the user signal reconstruction block 202 is deactivated and normal detection of all the users takes place.

In a different embodiment of the invention exemplified by another example of how the interference cancellation circuit might be controlled, the entire process can be made entirely independent of the knowledge that position location is even occurring. Referring again to FIG. 10, this would be the case if there was no position location input 602 to the control block 600. The user signal powers $P_i$ may be monitored continuously, and during periods when a user signal power which is greatest exceeds all of the others by a predetermined amount, the user signal reconstruction block 202 may be activated for that user signal. This would be much more difficult to implement than the previous example because without the a-priori knowledge of which user is expected to have increased power (i.e. which user is involved in position location) all user powers would need to be continuously and very accurately monitored.

Two examples of systems and methods for controlling the interference cancellation circuit have been described. It is to be understood that other methods and systems may be used within the scope of the invention.

The above described example has illustrated an interference cancellation circuit which cancels the interference due to one user, but the possibility of cancelling interference due to more than one user has been mentioned. However, it is to be noted that when multiple users are involved with position location, they will interfere with each other, and make the detection of the information channels less reliable. This introduces the possibility of instability, in that incorrect signals are cancelled from the composite signal thereby amplifying the interference. If the information channels cannot be reliably detected, then the interference cancellation circuit should not be used. The number of interfering users which may be cancelled will depend upon a given system's design. It may be limited to one in some cases, or it may be some larger number.

Numerous modifications and variations of the present invention are possible in light of the above teachings. It is therefore to be understood that within the scope of the appended claims, the invention may be practiced otherwise than as specifically described herein.

We claim:

1. An interference cancellation circuit for cancelling interference due to a particular user signal forming part of a digitized baseband composite signal when the particular user signal satisfies a predetermined constraint, the circuit comprising:

a baseband detection unit for detecting one or more detected data channels from said particular user signal and making an air interface channel characterization which is an estimate of an air interface channel over which the particular user signal was transmitted;

user signal regeneration circuitry for generating an interfering user signal reconstruction which is an estimate of said particular user signal by modulating said one or more data channel streams taking into account said air interface channel characterization;

delay circuitry for delaying the digitized baseband composite signal an amount substantially equal to the time it takes the baseband detection unit and user signal regeneration circuitry to create interfering user signal reconstruction; and subtraction circuitry for subtracting the interfering user signal reconstruction from the delayed digitized baseband composite signal to create a corrected digitized baseband composite signal.

2. A circuit according to claim 1 wherein said air interface characterization comprises an estimated phase shift, an estimated attenuation and an estimated timing for each of several multipaths in the particular user signal.

3. A circuit according to claim 1 wherein said digitized baseband composite signal contains a plurality of user signals, the circuit further comprising:

control circuitry for identifying whether one of said plurality of user signals satisfies said constraint and for establishing the one of said plurality of user signals as said particular user.

4. A circuit according to claim 3 wherein said control circuit comprises:

receive signal strength comparison circuitry for identifying whether one of the plurality of user signals has a receive signal greater than at least one other of the user signals by at least a predetermined amount, and selecting said particular user signal as the one of the plurality of user signals.

5. The circuit of claim 1 wherein said first baseband detection unit comprises:

a searcher for identifying multipaths forming said user signal; and a plurality of tracker fingers each for tracking a respective multipath identified by the searcher and producing a respective multipath estimate consisting of an amplitude, phase and timing of the multipath.

6. The circuit of claim 1 wherein said particular user signal contains a plurality of data channels, and said first baseband detection unit comprises channel specific detection circuits for each of said data channels.

7. The circuit of claim 5 wherein said user signal regeneration circuitry comprises channel specific circuitry for processing each of said data channels and a combiner for combing the processed data channels into a multiplexed channel;

for each multipath estimate a multipath reconstructor comprising:
   a) a modulator including code spreading and FIR filtering for multiplying the multiplexed channel by I and Q spreading signals in accordance with the timing estimate for that multipath estimate;
   b) a phase rotation function for applying a phase shift equal to the phase for that multipath estimate;
   c) an attenuation function for applying an attenuation equal to the amplitude for that multipath estimate;

summing circuitry for adding together an output of each multipath reconstructor.

8. A circuit according to claim 5 wherein said data channels includes a known information channel which is used to assist in detecting the user signal and in identifying multipaths of the user signal.

9. The circuit of claim 8 wherein the composite digitized baseband signal contains signals which are in accordance with the CDMA IS-95 3G standard, and the known information channel comprises the pilot channel of the particular user signal.

10. The circuit of claim 8 wherein said baseband detection unit comprises a complete CDMA IS-95 3G baseband detection unit with circuitry for detecting a CDMA IS-95 3G pilot channel component, and for demodulating power control bits in the pilot channel component, a fundamental channel, a supplementary and a control component; and wherein said user signal regeneration circuitry comprises a complete CDMA IS-95 transmit channel specific block, and for each multipath a multipath reconstructor comprising:
   a) a modulator including code spreading and FIR filtering for multiplying the multiplexed channel by I and Q spreading signals in accordance with the timing estimate for that multipath estimate;
   b) a phase rotation function for applying a phase shift equal to the phase for that multipath estimate;
   c) an attenuation function for applying an attenuation equal to the amplitude for that multipath estimate;

summing circuitry for adding together an output of each multipath reconstructor.

11. A circuit according to claim 1 further comprising circuitry for cancelling one or more additional user signals, the circuitry comprising for each additional user signal:

an additional baseband detection unit;

an additional user signal regeneration circuitry for generating a respective interfering user signal reconstruction;

subtraction circuitry for subtracting all interfering user signal reconstructions from the delayed digitized baseband composite signal.

12. A CDMA receiver comprising:

an antenna for receiving an RF composite spread spectrum signal over an air interface;

RF down conversion and A/D conversion circuitry for converting the composite spread spectrum signal into a digitized composite baseband signal;

an interference cancellation circuit for cancelling interference due to a particular user signal forming part of a digitized baseband composite signal when the particular user signal satisfies a predetermined constraint, the circuit comprising:

a baseband detection unit for detecting one or more detected data channels from said particular user signal and making an air interface channel characterization which is an estimate of an air interface channel over which the user signal was transmitted;

user signal regeneration circuitry for generating an interfering user signal reconstruction which is an estimate of said particular user signal by modulating said one or more data channel streams taking into account said air interface channel characterization;

delay circuitry for delaying the digitized baseband composite signal an amount substantially equal to the time it takes the baseband detection unit and user signal regeneration circuitry to create interfering user signal reconstruction;

subtraction circuitry for subtracting the interfering user signal reconstruction from the delayed digitized baseband composite signal to create a corrected digitized baseband composite signal; and a baseband detection unit for each user signal other than said particular user signal connected to receive the corrected composite digitized baseband signal and the channel characterization information for that user signal, for producing one or more received data streams for that user signal.

13. A receiver according to claim 12 wherein said first baseband detection unit comprises:
- a searcher for identifying multipaths forming said user signal; and
- a plurality of tracker fingers each for tracking a respective multipath identified by the searcher and producing a respective multipath estimate consisting of an amplitude, phase and timing of the multipath.

14. A receiver according to claim 13 wherein said data channels includes a known information channel which is used to assist in detecting the user signal and in identifying multipaths of the user signal.

15. A receiver according to claim 14 wherein said baseband detection unit comprises a complete CDMA IS-95 3G baseband detection unit with circuitry for detecting a CDMA IS-95 3G pilot channel component, and for demodulating power control bits in the pilot channel component, a fundamental channel, a supplementary and a control component; and
  wherein said user signal regeneration circuitry comprises a complete CDMA IS-95 transmit channel specific block, and for each multipath a multipath reconstructor comprising:
  a) a modulator including code spreading and FIR filtering for multiplying the multiplexed channel by I and Q spreading signals in accordance with the timing estimate for that multipath estimate;
  b) a phase rotation function for applying a phase shift equal to the phase for that multipath estimate;
  c) an attenuation function for applying an attenuation equal to the amplitude for that multipath estimate;
  summing circuitry for adding together an output of each multipath reconstructor.

16. A receiver according to claim 11 wherein said interference cancellation circuit has an input identifying any user(s) involved in position location, and wherein said particular user must be such a user involved in position location.

17. A method of reducing interference due to a particular user signal forming part of a composite digitized baseband signal comprising:
- selecting one of a plurality of user signals within said composite digitized baseband signal to the said particular user signal on the basis of one or more constraints;
- detecting one or more data channels in the particular user signal and making an estimate of an air interface over which the particular user signal was received;
- passing the detected data channels through a model of the air interface which is based upon the estimate of the air interface to produce an interfering user signal reconstruction;
- delaying the composite digitized baseband signal to produce a delayed composite digitized baseband signal an amount of time substantially equal to how long it takes for the steps of detecting and passing;
- subtracting the interfering user signal reconstruction from the delayed composite digitized baseband signal to produce a corrected composite digitized baseband signal.

18. A method according to claim 17 further comprising the steps of:
- monitoring a signal power of each of said plurality of user signals;
- comparing the signal powers to each other, and selecting the user signal having the highest power as said particular user only if it is higher in power than all other signals by a predetermined amount; and
- after selecting said particular user, deselecting the particular user when its power is no longer higher in power than all other signals by said predetermined amount.

19. A method according to claim 17 further comprising the steps of:
- maintaining information identifying which if any user signals pertain to users involved in position location;
- selecting the user signal of a user involved in position location as said particular user signal.

20. A method according to claim 18 further comprising the steps of monitoring a signal power of each of said plurality of user signals wherein said particular user signal to be selected must have a power greater than at least one other user signal by a predetermined amount.

* * * * *